United States Patent
Wah et al.

(10) Patent No.: US 9,762,997 B2
(45) Date of Patent: Sep. 12, 2017

(54) MOBILE DEVICE ACOUSTIC DIVIDER

(71) Applicant: Apple Inc., Cupertino, CA (US)

(72) Inventors: Melissa A. Wah, San Jose, CA (US); Stoyan P. Hristov, San Jose, CA (US); Phillip Tamchina, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 78 days.

(21) Appl. No.: 14/975,171

(22) Filed: Dec. 18, 2015

(65) Prior Publication Data

US 2017/0070813 A1 Mar. 9, 2017

Related U.S. Application Data

(60) Provisional application No. 62/215,607, filed on Sep. 8, 2015.

(51) Int. Cl.
| | |
|---|---|
| *H04R 29/00* | (2006.01) |
| *H04R 1/34* | (2006.01) |
| *H04R 1/08* | (2006.01) |
| *G10K 11/178* | (2006.01) |
| *H04M 1/20* | (2006.01) |
| *H04B 15/00* | (2006.01) |

(52) U.S. Cl.
CPC .......... *H04R 1/34* (2013.01); *G10K 11/1788* (2013.01); *H04B 15/00* (2013.01); *H04M 1/20* (2013.01); *H04R 1/08* (2013.01); *H04R 29/001* (2013.01); *G10K 2210/1081* (2013.01); *G10K 2210/3219* (2013.01); *G10K 2210/3224* (2013.01); *G10K 2210/3226* (2013.01); *H04R 2430/01* (2013.01)

(58) Field of Classification Search
CPC .......... H04R 1/34; H04R 1/08; H04R 29/001; H04R 2430/01; G10K 11/1788; G10K 2210/1081; G10K 2210/3224; G10K 2210/3226; H04B 15/00; H04M 1/20
See application file for complete search history.

(56) References Cited

U.S. PATENT DOCUMENTS

| | | | |
|---|---|---|---|
| 2005/0180582 A1* | 8/2005 | Guedalia | H04M 3/56 381/92 |
| 2015/0256922 A1* | 9/2015 | Shi | H04R 1/2842 381/353 |
| 2016/0073194 A1* | 3/2016 | Auclair | G10K 11/18 381/345 |
| 2016/0234604 A1* | 8/2016 | Saxena | H04R 19/04 |

* cited by examiner

*Primary Examiner* — Regina N Holder
(74) *Attorney, Agent, or Firm* — Kilpatrick Townsend & Stockton LLP

(57) ABSTRACT

A mobile communication device having an acoustic divider for minimizing acoustic coupling is disclosed. The mobile communication device includes a housing having an outer surface and internal sidewalls. The outer surface and internal sidewalls define a void disposed at and below the outer surface of the housing. The mobile communication device includes a receiver disposed within the housing and below a first portion of the void, and a microphone disposed within the housing and below a second portion of the void. An acoustic divider is disposed within the void and laterally disposed between the receiver and the microphone. The acoustic divider acoustically isolates the first and second portions of the void, thereby minimizing acoustic coupling between the receiver and the microphone.

20 Claims, 9 Drawing Sheets

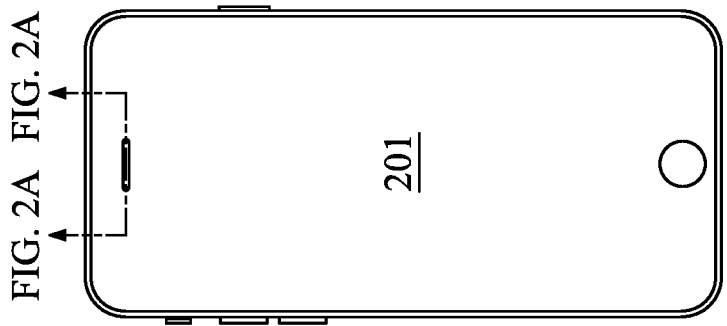
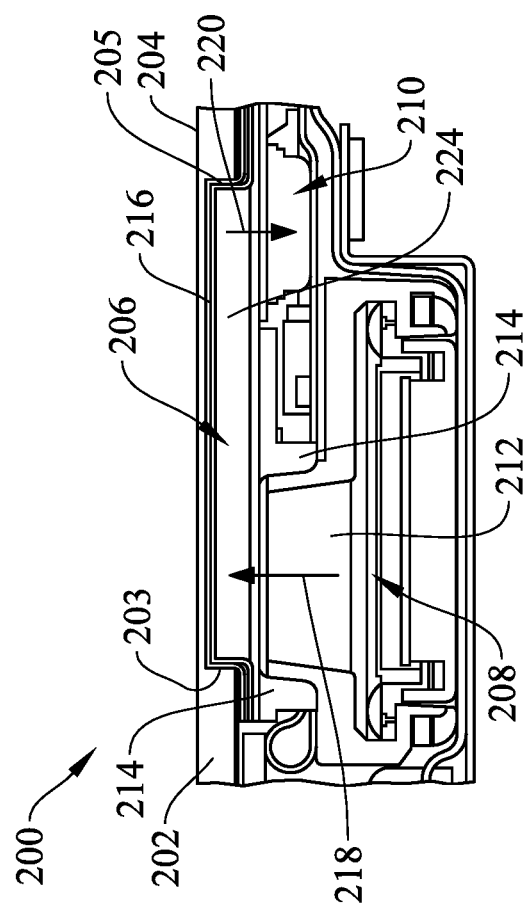

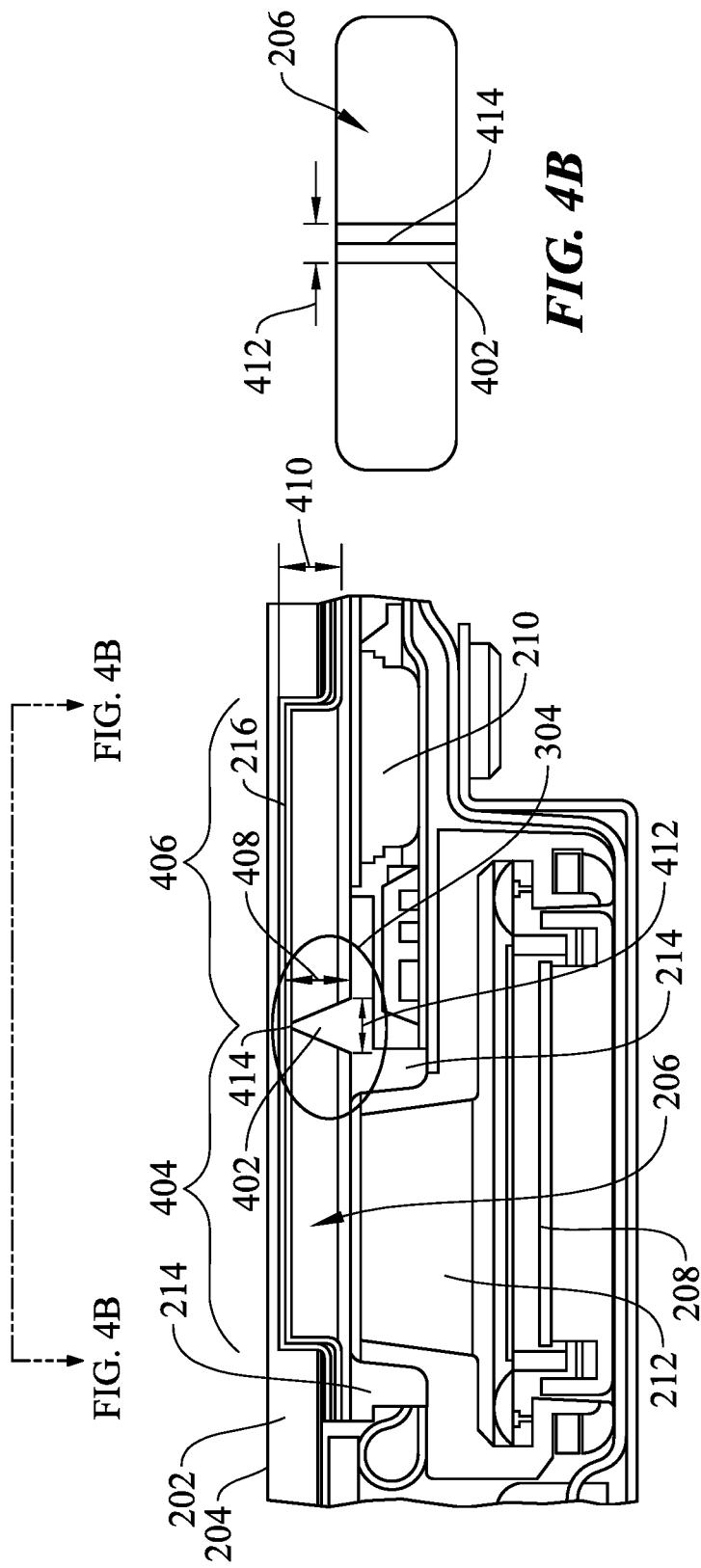

MOBILE DEVICE ACOUSTIC DIVIDER

CROSS-REFERENCES TO RELATED APPLICATIONS

This application claims priority to U.S. Provisional Patent Application No. 62/215,607, filed on Sep. 8, 2015, and titled "Mobile Device Acoustic Divider," the disclosures of which are hereby incorporated by reference in their entirety for all purposes.

BACKGROUND

Modern mobile communication devices, such as smart phones and the like, utilize various forms of acoustic devices, such as receivers (i.e., speakers) and microphones. Receivers may emit sound into a user's ear when the device is being used, such as during a phone call. Microphones may be used to receive voice input from a user during a call, the voice input being transmitted to a communication device operated by the other user on the call. Microphones may also receive sound emitted from receivers and/or sounds emitted external to the device (e.g., background noise). In certain situations, the background noise may be too loud, thereby hindering a user's ability to clearly hear the sound emitted from the receiver. Additionally, contours of a user's ear may create variation in the strength of sounds emitted from the receiver, thus causing the emitted sounds to sound muffled when the device is placed in certain positions against the user's ear.

Modern mobile communication devices may incorporate active noise cancellation and auto loudness functionalities at the receiver to address such issues. To perform active noise cancellation, a microphone may be placed in a position to receive background noise. Once the background noise is received, the receiver may emit noise-canceling sounds that induce destructive interference to cancel out the background noise. An error-detecting microphone may be placed near a receiver to measure the strength of the noise-canceling sounds emitted from the receiver. Depending on the measured strength of noise-canceling sounds, the receiver may be driven to increase or decrease the strength of its outputted sound to achieve a target active noise cancellation. In addition to achieving a target active noise cancellation, the error-detecting microphone may also be used to equalize the sound emitted from the receiver. For example, if the receiver is placed against a user's ear such that the sound is muffled, the error-detecting microphone may detect the muffled sound and cause the device to emit a stronger sound from the receiver.

Implementation of an error-detecting microphone in modern mobile communication devices may prove problematic. For example, coupling may occur between the receiver and the error-detecting microphone that adversely affects execution of active noise cancellation and/or equalization. Thus, improvements to such functionalities are desired.

SUMMARY

Embodiments provide methods and apparatuses for improved sound detection by minimizing acoustic coupling. In certain embodiments, an acoustic divider may be incorporated into a mobile communication device to minimize coupling between a receiver and a microphone. The acoustic divider may improve the performance of particular functionalities (e.g., active noise cancellation and auto loudness equalization) of the mobile communication device.

In some embodiments, a mobile communication device includes a housing having an outer surface and internal sidewalls. The outer surface and internal sidewalls may define a void disposed at and below the outer surface of the housing. The mobile communication device may include a receiver and a microphone. The receiver may be disposed within the housing and below a first portion of the void, and may be configured to emit sound into the void. The microphone may be disposed within the housing and below a second portion of the void, and may be configured to detect sound present in the void. The mobile communication device may further include an acoustic divider that is disposed within the void and laterally disposed between the receiver and the microphone. The acoustic divider may acoustically isolate the first and second portions of the void.

In some embodiments, a method of preventing acoustic sound coupling in a mobile communication device includes emitting, by a receiver, sound into a first portion of a void disposed in a housing of the mobile communication device. The method includes reflecting, by an acoustic divider, the emitted sound. Reflection of the emitted sound may cause the emitted sound to travel through the first portion and out of the void. The method may further include detecting, by a microphone, at least a portion of the emitted sound. The detected sound may travel to the microphone from outside of the void and through a second portion of the void. The second portion of the void may be acoustically isolated form the first portion of the void by the acoustic divider.

A better understanding of the nature and advantages of embodiments of the present invention may be gained with reference to the following detailed description and the accompanying drawings.

BRIEF DESCRIPTION OF THE DRAWINGS

FIG. 2A is a simplified diagram of an internal portion of a mobile communication device without an acoustic divider, according to embodiments of the present invention.

FIG. 2B is a simplified diagram of a top down perspective of a mobile communication device, according to embodiments of the present invention.

FIG. 4A is a simplified diagram of an internal portion of a mobile communication device with an acoustic divider, according to embodiments of the present invention.

FIG. 4B is a simplified diagram of a top down perspective of a void and an acoustic divider, according to embodiments of the present invention.

DETAILED DESCRIPTION

Embodiments describe a mobile communication device having an acoustic divider for minimizing acoustic coupling between a receiver and a microphone. The acoustic divider may be positioned to prevent sound emitted from the receiver from being detected by the microphone before the sound exits the mobile communication device. For instance, the acoustic divider may reflect sound emitted from the receiver away from the microphone such that the sound may exit the device and reflect off a user's ear before the sound can be detected by the microphone. As will be discussed further herein, the acoustic divider may have various structures and be formed of various materials to minimize acoustic coupling between the receiver and the microphone. The structure of the acoustic divider may also be configured to be visually inconspicuous such that a user may not easily see the acoustic divider. Thus, the acoustic divider may not affect the appearance of the mobile communication device.

Minimal coupling between the receiver and the microphone may improve the noise-canceling and sound equalizing functionalities of a mobile communication device, thereby improving the mobile communication device's user experience.

To better understand the purpose of the acoustic divider, the role of the mobile communication device, as well as its structural configuration, is discussed in more detail herein.

I. Mobile Communication Device

Figure 1:
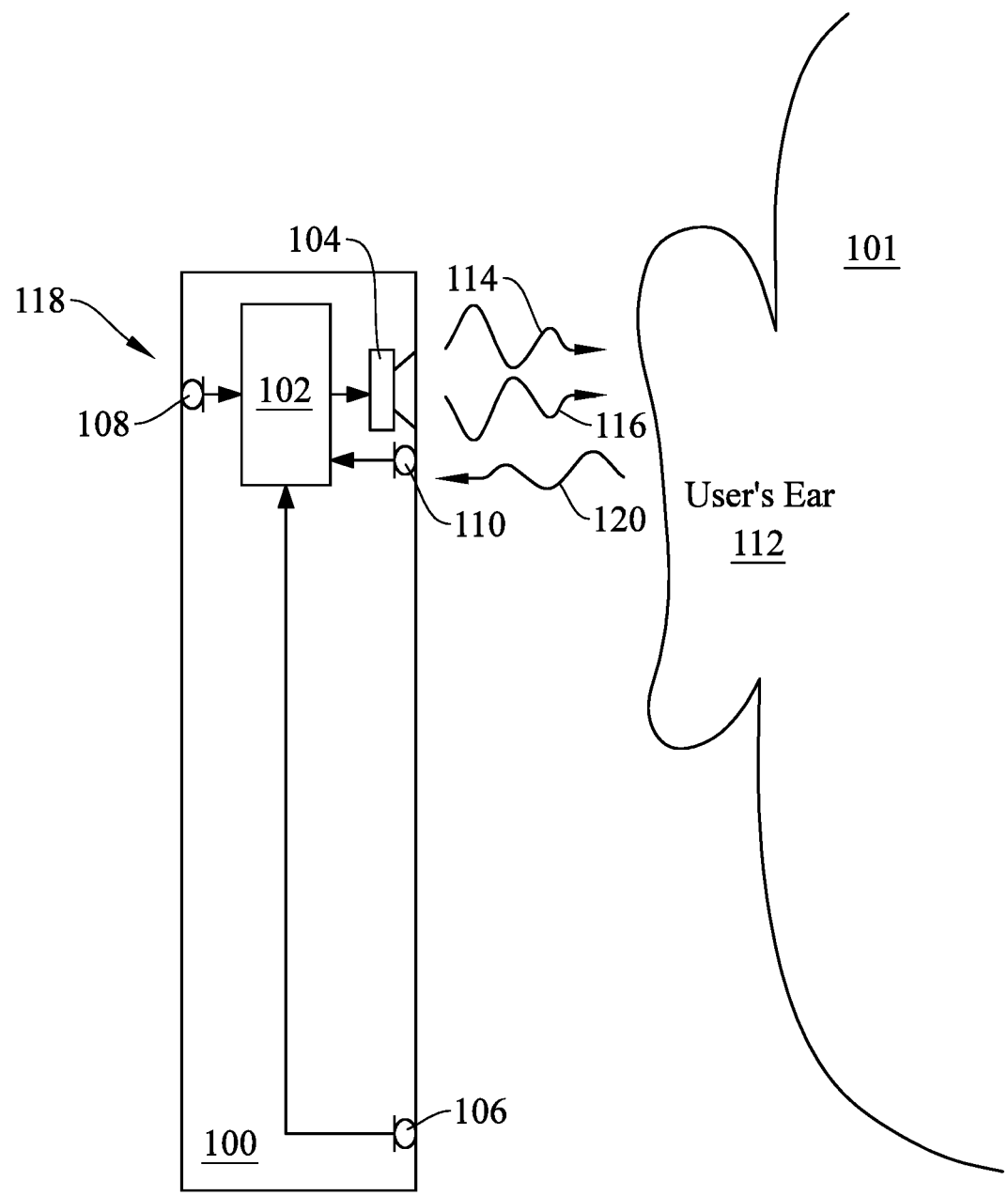
FIG. 1 is a simplified diagram of a mobile communication device interacting with a user, according to embodiments of the present invention.

FIG. 1 illustrates an exemplary mobile communication device 100 in accordance with some embodiments of the present invention. In embodiments, mobile communication device 100 may be a phone that is configured to transmit and receive sounds to and from a user 101. Mobile communication device 100 may include a processor 102 coupled to a receiver 104 and microphones 106, 108, and 110. Receiver 104 may be any suitable electronic device component that emits sounds. For instance, receiver 104 may be a speaker that contains a diaphragm that vibrates at various frequencies to emit sound 114. Emitted sound 114 may be heard by user 101.

Microphones 106, 108, and 110 may be electronic device components that are suitable for detecting sounds. Depending on where microphones 106, 108, and 110 are located, different types of sounds may be detected. As an example, microphone 106 may be positioned near a bottom of mobile communication device 100 toward user 101. Being positioned at the bottom of device 100 may allow microphone 106 to detect sounds spoken by user 101.

In contrast to microphone 106, microphone 108 may be disposed on a back of mobile communication device 100 to detect ambient/background noise 118 surrounding device 100. Microphone 108 may be pointed away from user 101 and receiver 104 such that ambient/background noise 118 can be measured without detecting non-ambient/background sounds emitted by user 101 and receiver 104.

Microphone 110 may be positioned near a top of mobile communication device 100 toward user 101. In embodiments, microphone 110 may be positioned proximate to receiver 104 such that sounds emitted from receiver 104 may be detected by microphone 110. Microphone 110 may be an error-detecting microphone that is used to detect sounds emitted from receiver 104. Error-detecting microphones may be used to ensure that receiver 104 is emitting sound at a proper strength.

A. Active Noise Cancellation

In embodiments, processor 102 may be configured to perform various functionalities, such as active noise cancellation. Active noise cancellation is a method for reducing unwanted sound by the addition of a second sound specifically designed to cancel the unwanted sound. Canceling a sound may be performed by creating destructive interference. Destructive interference is when two identical sound waves are phase shifted to a degree where the sound waves are inverted with respect to one another. For instance, two substantially identical sound waves may be phase shifted by 180 degrees to be inverted with respect to one another. The inverted sound waves cancel one another out because a positive amplitude value of one sound wave is offset by an equal-but-negative value of the other sound wave, thus effectively reducing the volume of the perceivable sound or substantially eliminating it altogether.

Complex algorithms that perform such active noise cancellation functionality may be carried out by processor 102 by interacting with and controlling various device components such as receiver 104 and microphones 108 and 110. Microphone 108 may detect ambient noise 118 surrounding mobile communication device 100. Detected ambient noise may be received by processor 102, which may in turn cause receiver 104 to emit a noise-canceling sound 116 that causes destructive interference with detected ambient noise 118. Accordingly, the volume of ambient noise 118 may be effectively reduced.

To ensure that detected ambient noise 118 is effectively reduced, microphone 110 may be utilized to measure effective sound 120. In embodiments, effective sound 120 may include emitted noise-canceling sound 116 reflected off user's ear 112 which approximates the sound actually perceived by the user. Cancellation of ambient noise 118 may be achieved when the magnitude of noise-canceling sound 116 is substantially similar, if not the same, as the magnitude of ambient noise 118. Thus, by detecting effective sound 120, processor 102 may be able to determine the magnitude of noise-canceling sound 116 and ensure that noise-canceling sound 116 is emitted at the proper magnitude. If reflected sound 120 indicates that the magnitude of noise-canceling sound 116 is too small, processor 102 may cause receiver 104 to emit noise-canceling sound 116 at a larger magnitude. Alternatively, if processor 102 determines that the magnitude of noise-canceling sound is too large, it may cause receiver 104 to emit noise-canceling sound 116 at a smaller magnitude.

B. Auto Loudness

In addition to active noise cancellation, processor 102 may be configured to perform auto loudness. Auto loudness is a method of reducing sound variation across a variety of positions between mobile communication device 100 and user's ear 112. A user's ear may have a variety of contour profiles. When mobile communication device 100 is pressed upon user's ear 112, some areas of user's ear 112 may press against mobile communication device 100 and may cause sound emitted from receiver 104 to have a lower volume as perceived by the user. For instance, an ear's protruding contour may press against and/or block at least a portion of receiver 104, causing effective sound 120 (i.e. the approximate sound heard by user's ear 112) to decrease in volume. A user's ear may also seal differently with mobile communication device 100 across a variety of positions. For example, if mobile communication device 100 is positioned such that a gap exists between it and user's ear 112, there may be a poor seal created between the two, thereby decreasing the volume of the sound heard by user 101. In embodiments, effective sound 120 may be detected by error-detecting microphone 110. Processor 102 may determine that the volume of effective sound 120 is too low and thus compensate by increasing the volume of emitted sound 114. Similarly, processor 102 may decrease the volume of emitted sound 114 when a contour profile of user's ear 112 causes an undesirable increase in volume of effective sound 120.

Furthermore, auto loudness may also reduce sound variations across a variety of pressures between mobile communication device 100 and user's ear 112. When mobile communication device 100 is pressed against user's ear 112, the degree of applied pressure may cause a corresponding variation in sound volume. For instance, applying higher pressure may cause a greater area of mobile communication device 100 to press upon user's ear 112. Thus, more regions of user's ear 112 may press upon receiver 104, resulting in an increase in volume of effective sound 120. As a result, processor 102 may determine that the emitted volume is too high and compensate for the higher volume by decreasing the volume of emitted sound 114. Similarly, an increase in the volume of emitted sound 114 may occur for positions where a lower applied pressure causes a decrease in volume of effective sound 120.

Both functionalities require proper detection of the volume of effective sound 120. An inaccurate reading of effective sound 120 may result in an ineffective canceling of background noise, or an undesirable change in volume, thereby resulting in a poor user experience. In embodiments, the internal structure of mobile communication device 100 may enable accurate detection of emitted sound 120, as will be discussed further herein.

II. Internal Structure

FIG. 2A illustrates a cross-sectional view of an internal structure 200 of a mobile communication device, such as mobile communication device 201 shown in FIG. 2B. The cross-sectional view of FIG. 2A may be taken across a portion of mobile communication device 201 where a receiver and a microphone are located to illustrate the internal structural configuration of the receiver and the microphone. One skilled in the art understands that the illustration of FIG. 2A illustrates only a portion of the internal structure of the mobile communication device, and that the mobile communication device may include several other structures and/or electrical components not depicted.

As shown in FIG. 2A, internal structure 200 of the mobile communication device may include a housing 202 having an outer surface 204. Housing 202 may include various internal structures (e.g., components that are inside the mobile communication device) that provide structural support for internal electrical components. Housing 202 may also include a frame within which the internal electrical components may be contained. In embodiments, housing 202, which contains the various internal structures, may be formed of various materials. For instance, housing 202 may include an outer structure that is formed of glass. Additionally, internal support structures of housing 202 may be formed of rubber-like material, such as silicone. Furthermore, housing 202 may include a frame that is formed of a hard material, such as a metal (e.g., aluminum). In embodiments, housing 202 also includes internal sidewalls 203 and 205. Internal sidewalls 203 and 205 may be substantially vertical sidewalls that define a vacant region within which sound may travel into and out of the mobile communication device.

In embodiments, a receiver 208 and a microphone 210 are disposed within housing 202. Receiver 208 may be any suitable electrical component capable of emitting sound. For instance, receiver 208 may be a speaker having a diaphragm that can vibrate at various frequencies to emit sound waves. In certain embodiments, receiver 208 is a cross-sectional representation of receiver 104 illustrated in FIG. 1. Microphone 210 may be an electrical component configured to detect sound. For instance, microphone 210 may have a diaphragm that can vibrate according to a perceived sound to detect sound waves. Microphone 210 may be positioned proximate to and laterally from receiver 208 so that sound emitted from receiver 208 can be detected by microphone 210. In embodiments, microphone 210 may be an error-detecting microphone, such as microphone 110 discussed herein with respect to FIG. 1.

According to some implementations, a void 206 is disposed in housing 202. Void 206 may be defined by top surface 204 and internal sidewalls 203 and 205 of housing 202. In embodiments, void 206 may be disposed above receiver 208 and microphone 210 and may extend downward from outer surface 204 of housing 202 toward receiver 208 and microphone 210. Void 206 may be a vacant space within which sound may propagate from receiver 208, and within which sound may enter into microphone 210. As an example, sound 218 emitted from receiver 208 may enter into void 206, and sound 220 from void 206 may be detected by microphone 210. Accordingly, receiver 208 and microphone 210 may be acoustically coupled to void 206. Void 206 may bridge between receiver 208 and microphone 210. In some embodiments, sound 218 may include sounds 114 and 116 discussed herein with respect to FIG. 1.

Because receiver 208 as shown in FIG. 2A is disposed a distance away from void 206, an acoustic channel 212 may be positioned between receiver 208 and void 206 to allow sounds 218 emitted from receiver 208 to enter into void 206 and exit the device. An acoustic sealing boot 214 may be positioned around acoustic channel 212 to acoustically seal acoustic channel 212 to the exterior of the mobile communication device. Because acoustic sealing boot 214 is a component disposed within the mobile communication device, acoustic sealing boot 214 may be part of housing 202 even though it is a physically separate structure. Additionally, acoustic sealing boot 214 may insulate other electrical components (e.g., microphone 210) from unintentional acoustic coupling. Unlike receiver 208, microphone 210 may abut void 206. Thus, sound entering into void 206 may be received by microphone 210 without having to use a separate acoustic channel. One skilled in the art understands that the embodiment illustrated in FIG. 2A is merely one embodiment that is not intended to be limiting. Receiver 208 and microphone 210 may be placed close to or far away from void 206 as long as it is acoustically coupled to void 206 without departing from the spirit and scope of the present invention.

In embodiments, a mesh 216 may be positioned to enclose void 206. As an example, mesh 216 may be positioned proximate to a plane of outer surface 204 of housing 202. Mesh 216 may be formed of a plurality of apertures configured to prevent debris from entering void 206 while permitting sound to propagate between void 206 and areas outside of the mobile communication device. Accordingly, mesh 216 may be have a grid-like pattern that forms a pattern of evenly distributed apertures through which sound may propagate. In embodiments, mesh 216 may cause certain sound waves to be trapped within void 206. The trapped sound waves may cause acoustic coupling between receiver 208 and microphone 210, as will be discussed further herein.

A. Mobile Communication Device without Acoustic Divider

As aforementioned herein, proper operation of functionalities such as active noise cancellation and auto loudness generally require accurate measurement of sounds emitted by receiver 208 that are heard by a user (e.g., accurate measurement of effective sound 120 discussed in FIG. 1 herein). Conventional internal structures of mobile communication devices may be susceptible to inaccurate measurements of sounds heard by a user, as discussed herein with respect to FIG. 3.

Figure 3:
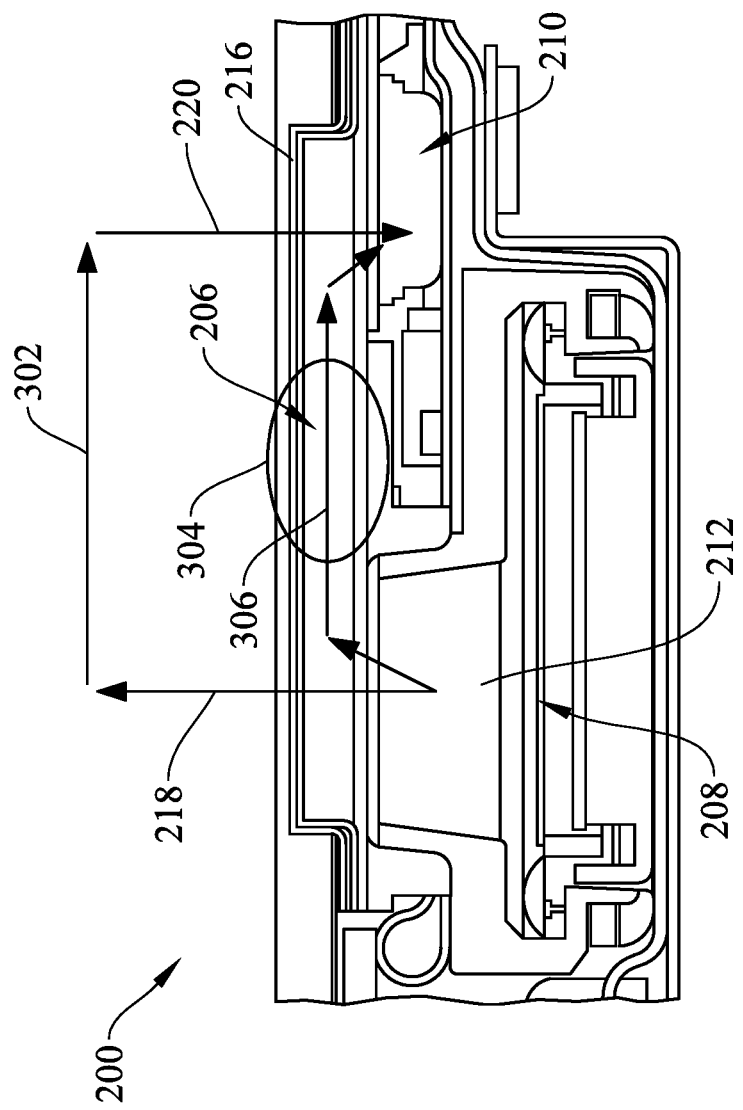
FIG. 3 is a simplified diagram of sound flow through an internal portion of a mobile communication device without an acoustic divider, according to embodiments of the present invention.

FIG. 3 illustrates an exemplary flow of sounds for a conventional mobile communication device during use. Emitted sound 218 from receiver 208 may enter into void 206 and subsequently exit out of the mobile communication device through mesh 216. Once exited from the mobile communication device, emitted sound 218 may be heard by a user, such as user 101 in FIG. 1. Portions 302 of emitted sound 218 outside of the mobile communication device may enter back into void 206 as effective sound 220 (e.g., by reflecting off the user's ear). Effective sound 220 may then be detected by microphone 210 for active noise cancellation and/or auto loudness functionalities.

As shown in FIG. 3, void 206 may bridge between receiver 208 and microphone 210. Accordingly, void 206 may have a bridging portion 304 that is laterally disposed between receiver 208 and microphone 210. Bridging portion 304 may allow a portion 306 of emitted sound 218 to flow across void 206 and be detected by microphone 210 before having a chance to exit out of the mobile communication device. Portion 306 of emitted sound 218 may be detected by microphone 210 in addition to the effective sound 220. As a result, microphone 210 may not accurately detect effective sound 220, as effective sound 220 may appear to have an additional sound from portion 306. This disturbance detected by microphone 210 is known herein as "acoustic coupling."

Acoustic coupling may occur because of the acoustic properties of mesh 216 as well as the bridging portion 304 of void 206. For example, mesh 216 may reflect portion 306 of emitted sound 218 back into void 206. Once reflected, portion 306 may propagate within void 206 through the bridging portion 304 and be subsequently detected by microphone 210. Different frequencies may have a higher tendency to be reflected back into void 206. As an example, lower frequencies may be more likely to be reflected back into void 206 and cause acoustic coupling.

According to embodiments of the present invention, an acoustic divider may be implemented within void 206 to minimize acoustic coupling between receiver 208 and microphone 210, as will be discussed further herein.

B. Internal Structure with Acoustic Divider

FIG. 4A illustrates an exemplary cross-section of a portion of a mobile communication device having an internal structure with an acoustic divider. For ease of discussion, FIG. 4A includes several components shared by the internal structure of FIG. 3. Components that are shared between both figures have identical reference numbers for ease of reference.

As shown in FIG. 4A, an acoustic divider 402 may be implemented within void 206. In some embodiments, acoustic divider 402 may be disposed within bridging portion 304 of void 206. Acoustic divider 402 may be positioned in void 206 such that void 206 is divided into two portions: a receiver portion 404 (i.e. a first portion) and a microphone portion 406 (i.e. a second portion). In embodiments, receiver portion 404 may be acoustically coupled with receiver 208 such that sounds emitted from receiver 208 may be emitted into receiver portion 404 of void 206. Additionally, microphone portion 406 may be acoustically coupled with microphone 210 such that sounds entering into microphone portion 406 from outside the mobile communication device may be detected by microphone 210. Thus, acoustic divider 402 may be positioned laterally between receiver 208 and microphone 210.

1. Structure of Acoustic Dividers

In embodiments, the structural dimensions of acoustic divider 402 may affect the degree of coupling between receiver portion 404 and microphone portion 406. Taller acoustic dividers 402 may result in better mitigation of acoustic coupling between receiver 208 and microphone 210. For instance, acoustic divider 402 may have a height 408 that is substantially similar to, if not the same as, a height 410 of void 206. Having the same height ensures that emitted sound from receiver 208 in receiver portion 404 does not flow over acoustic divider 402 into microphone portion 406 and be subsequently detected by microphone 210. In such instances, a top peak 414 of acoustic divider 402 may be located against mesh 216 or very close to it. In some embodiments, height 408 of acoustic divider 402 ranges between 0.5 to 3 mm. In certain embodiments, height 408 is approximately 1 mm.

In addition to the height, a width of acoustic divider 402 may also affect the amount of acoustic coupling. Larger widths may result in better acoustic isolation, thereby resulting in less acoustic coupling. In embodiments, acoustic divider 402 may have a width 412. Width 412 may also be wide enough to structurally support acoustic divider 402. For instance, width 412 may be wide enough to substantially minimize acoustic coupling. In addition to mitigating acoustic coupling, width 412 may also be wide enough to ensure that acoustic divider 402 does not break when exposed to typical forces or when exposed to extreme forces, such as when the mobile communication device is dropped. Furthermore, width 412 may also be wide enough to withstand handling during assembly. In embodiments, width 412 may range between 0.5 to 3 mm, with some particular embodiments ranging between 0.5 to 1 mm.

In embodiments, acoustic divider 402 may be configured in various ways. For instance, acoustic divider 402 may be formed as part of housing 202. Specifically, acoustic divider 402 may be a portion of acoustic sealing boot 214 of housing 202. Acoustic sealing boot 214 may be a separate part of housing 202. In such configurations, acoustic divider 402 and acoustic sealing boot 214 may from a single unitary body. In other embodiments, acoustic divider 402 may be a separate structure that is fixed in position. As an example, acoustic divider 402 may be a separate structure that is attached to acoustic sealing boot 214 with an adhesive or a mechanical fastener. As another example, acoustic divider 402 may be a separate structure that is attached to mesh 216. It is to be appreciated that acoustic divider 402 may be attached to any structure capable of mechanically supporting acoustic divider 402.

In embodiments, acoustic divider 402 may have a cross-sectional shape of a triangle as shown in FIG. 4A. Having sloped side surfaces may cause sound to change direction when it reflects off acoustic divider 402. Additionally, sloped side surfaces minimizes visual impact when observed from above (e.g., through mesh 216). Top peak 414 of acoustic divider 402 may have a small footprint such that a user may not easily see the presence of acoustic divider 402. Accordingly, an aesthetic appeal of the mobile communication device may not be impacted by the presence of acoustic divider 402.

FIG. 4A is a two-dimensional illustration of the internal structure of a portion of the mobile communication device. One skilled in the art understands that there is a depth component to FIG. 4A that is not readily apparent. To show this depth, FIG. 4B illustrates a top view perspective of void 206 and acoustic divider 402. As shown, acoustic divider 402, although illustrated as a triangle in FIG. 4A, may be a triangular prism that spans across a vertical component of void 206.

In embodiments, acoustic divider 402 may be formed of any suitable material capable of preventing the propagation of sound. For instance, acoustic divider 402 may be formed of a sound-reflective material. In some embodiments, acoustic divider 402 may be formed of silicone, plastic, foam, steel, aluminum, or the like.

Figure 4C:
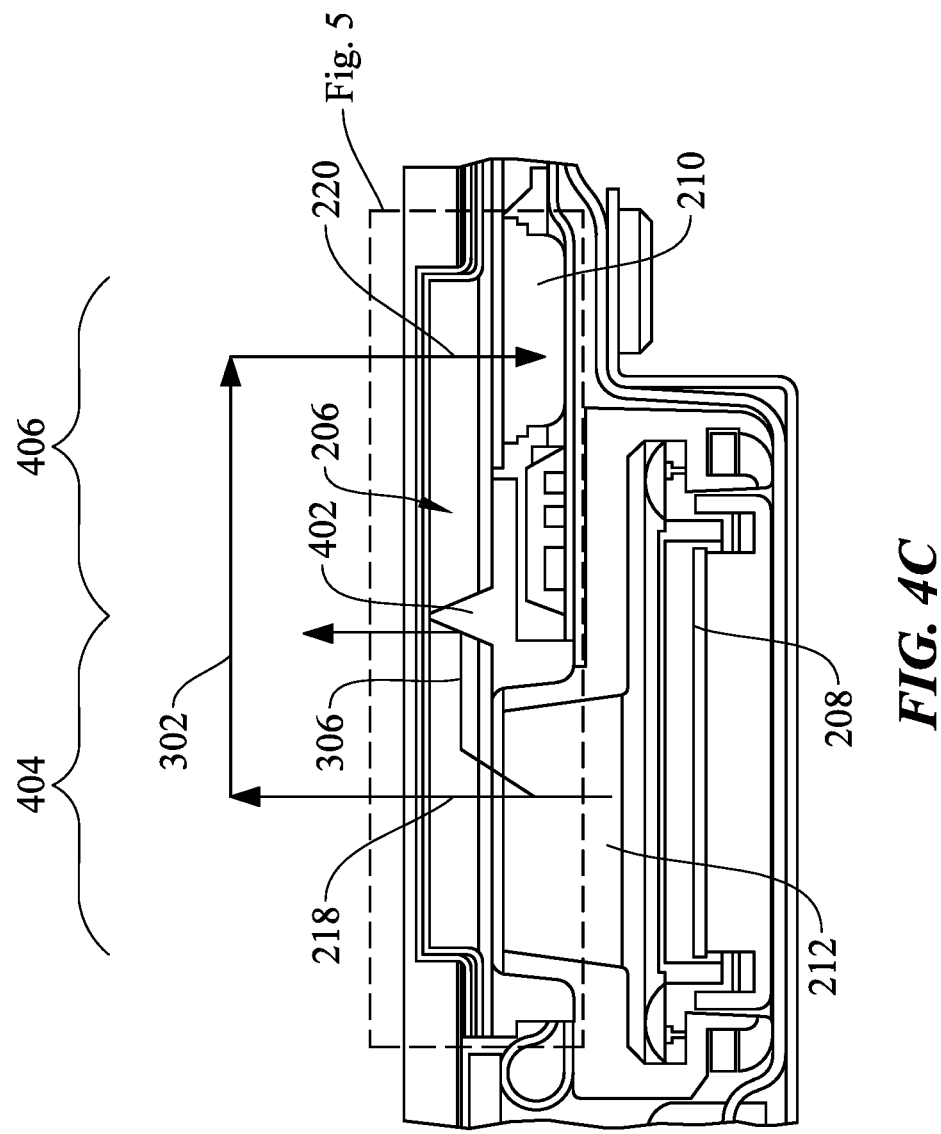
FIG. 4C is a simplified diagram of sound flow through an internal portion of a mobile communication device with an acoustic divider, according to embodiments of the present invention.

FIG. 4C illustrates the flow of sound for a mobile communication device having an acoustic divider 402. As shown, emitted sound 218 may emit from receiver 208, flow into receiver portion 404 of void 206 and out of the mobile communication device. Portions 302 of emitted sound 218 may flow into microphone portion 406 of void 206 and be detected by microphone 210. Portions 302 can be reflected by a user's ear, for example, into microphone portion 406 of void 206. Unlike the flow of sounds in instances where there is no acoustic divider 402, portion 306 of emitted sound 218 that is emitted into receiver portion 404 of void 206 may be prevented from propagating into microphone portion 406 by acoustic divider 402. In some embodiments, portion 306 of emitted sound 218 is reflected by acoustic divider 402. Once reflected, portion 306 of emitted sound 218 may exit out of the mobile communication device. Portions 302 and 306 of sound 218 may then enter back into void 206 as effective sound 220. Effective sound 220 may then be detected by microphone 210. In embodiments, microphone 210 may thus only detect sound entering into void 206 from outside of the mobile communication device, such as effective sound 220. Accordingly, acoustic divider 402 may substantially minimize acoustic coupling.

FIGS. 4A and 4C illustrate acoustic divider 402 as a triangular prism; however, embodiments are not so limited. For instance, acoustic divider 402 may have other geometrical shapes and materials such that acoustic coupling between a receiver and a microphone is minimized, without departing from the spirit and scope of the present invention.

2. Types of Acoustic Dividers

FIGS. 5A-5D illustrate cross-sectional perspectives of different types of acoustic dividers according to embodiments of the present invention. As illustrated, FIGS. 5A-5D are each close-up images of the region in FIG. 4C bounded by dotted lines Each type of acoustic divider may have a specific geometric shape and/or be formed of a particular material.

Figure 5A:
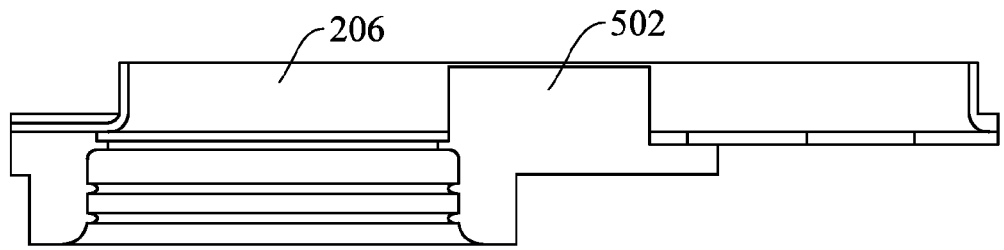
FIGS. 5A-5D are simplified diagrams of different types of acoustic dividers, according to embodiments of the present invention.

FIG. 5A illustrates an acoustic divider 502 that is in the shape of a rectangular prism. As shown in FIG. 5A, acoustic divider 502 appears as a rectangle, but the depth component of the image is not readily apparent. Acoustic divider 502 may have substantially straight sidewalls such that acoustic divider 502 has equal width across its height. That is, acoustic divider 502 may have a non-tapering structure that is just as wide at its top as at its base. Having a non-tapering structure may allow acoustic divider 502 to achieve maximum reduction of acoustic coupling across its entire height. Acoustic divider 502 may be formed of a material that reflects sound, such as silicone.

Although acoustic divider 502 has vertical sidewalls, embodiments are not limited to such configurations. For instance, acoustic divider 502 may have curved sidewalls, such as concave or convex sidewalls, for isolating acoustic sounds. Further, in some alternative embodiments, acoustic divider 502 may incorporate a tapered structure.

In embodiments, the rectangular structure of acoustic divider 502 may cause acoustic divider 502 to have a large visual footprint. Given its large visual footprint, a user may be able to see acoustic divider 502 from outside of the mobile communication device.

Figure 5B:
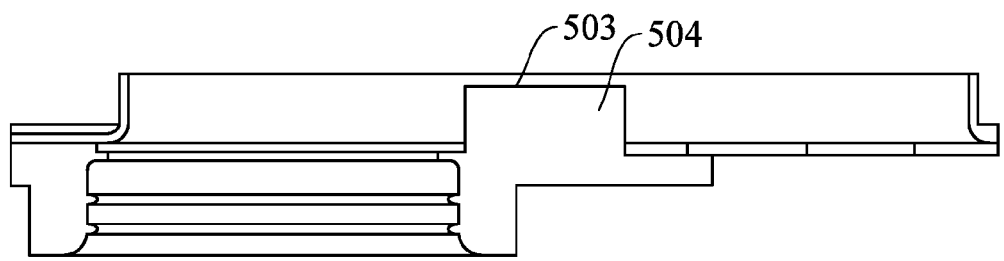

One way to minimize the visual impact of acoustic divider 502 is to decrease its height so that its top surface 503 is farther away from top of the void 206. FIG. 5B illustrates an acoustic divider 504 that is in the shape of a rectangular prism that has a smaller height than acoustic divider 502. In embodiments, acoustic divider 504 may not minimize acoustic coupling as well as acoustic divider 502 of FIG. 5A, but its visual impact may be slightly decreased. As shown in FIGS. 5A and 5B, the structure of an acoustic divider can be altered to achieve better resistance to acoustic coupling or to reduce its visual footprint.

Figure 5C:
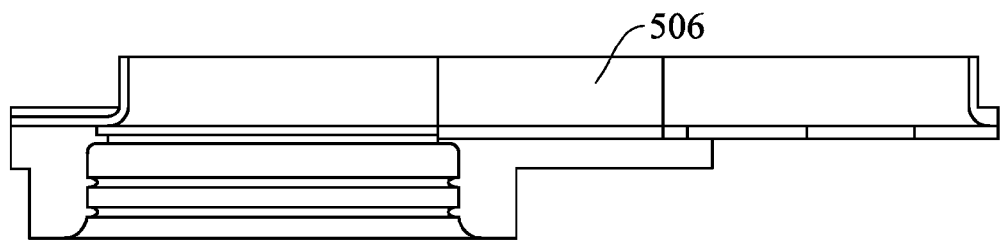

FIG. 5C illustrates an acoustic divider 506 in the shape of a rectangular prism, such as acoustic divider 502, but formed of a different material. In embodiments, acoustic divider 506 may be formed of foam. Foam is a porous material that has sound-absorbing properties. Thus, acoustic divider 506 may absorb sound to prevent acoustic coupling. Similar to acoustic dividers 502 and 504, the size of acoustic divider 506 can be adjusted to reduce visual footprint or to enhance the alleviation of acoustic coupling.

Figure 5D:
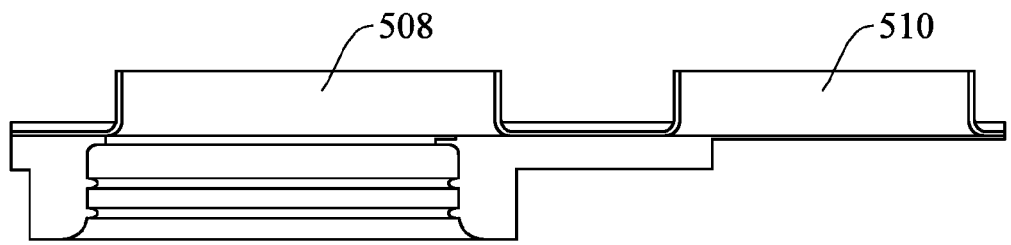

FIG. 5D illustrates another structure that may be used to prevent acoustic coupling. As shown, two separate sound channels may be used to prevent acoustic coupling. For example, a receiver sound channel 508 and a microphone sound channel 510 may be used to prevent acoustic coupling. In embodiments, receiver sound channel 508 may contain sound emitted from a receiver to stay within receiver sound channel 508. Likewise, microphone sound channel 510 may prevent detection of sound emitted from the receiver before the sound exits the mobile communication device. Thus, the receiver sound channel 508 and the microphone sound channel 510 may be acoustically isolated from one another. By creating this acoustic isolation, acoustic coupling may be minimized. Heights of both the receiver sound channel 508 and the microphone sound channel 510 may be sufficient to extend across the entire height of void 206. For instance, the heights of both sound channels 508 and 510 may be equal to the height of void 206. In such instances, top surfaces of channels 508 and 510 may be adjacent to, or even directly contacting, mesh 216 to substantially minimize coupling of sound within void 206. In embodiments, sound channels 508 and 510 may be formed of any suitable material such as a plastic or a metal. In certain embodiments, sound channels 508 and 510 are formed of aluminum. It is to be appreciated that sound channels 508 and 510 may be a part of the housing, such as housing 202 in FIG. 2A.

C. Utilizing Layers to Minimize Visual Footprint

Visibility of an acoustic divider outside the mobile communications device may adversely affect the overall visual aesthetics of the device. To minimize such visual footprint, a layer may be formed on top of the acoustic divider. The layer may have certain attributes that minimize reflection of light back to a user, thereby making the acoustic divider harder to see.

Figure 6A:
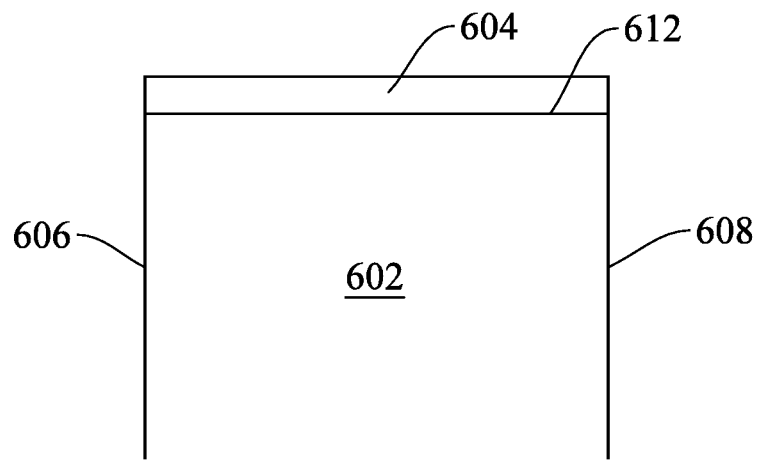
FIGS. 6A-6B are simplified diagrams of anti-reflective layers for acoustic dividers, according to embodiments of the present invention.

FIG. 6A illustrates an exemplary acoustic divider 602 having an anti-reflective layer 604. Acoustic divider 602 may have a top surface 612 and side surfaces 606 and 608. In embodiments, anti-reflective layer 604 may be disposed on top surface 612. Anti-reflective layer 604 may be a layer of material that minimizes reflection of light. For instance, anti-reflective layer 604 may be a layer of dark colored material. The dark colored material may absorb a broad spectrum of visual light. In some embodiments, anti-reflective layer 604 (e.g., a dark colored material) may have a rough surface. The rough surface may be formed of a random arrangement of small surface variations. The arrangement of small surface variations may enhance the anti-reflective properties of layer 604 by scattering light incident on layer 604. In other embodiments, anti-reflective layer 604 may have an organized arrangement of surface variations, as shown in FIG. 6B discussed herein.

Figure 6B:
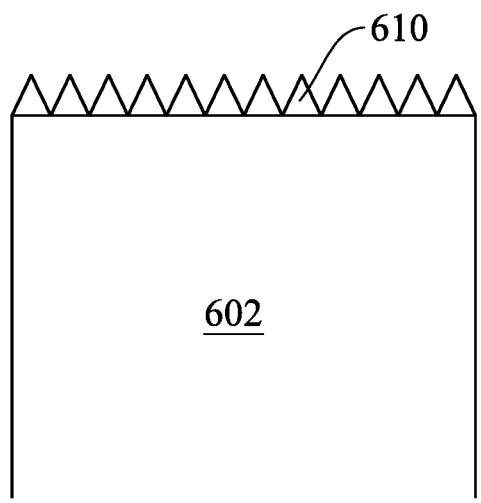

FIG. 6B illustrates acoustic divider 602 having an alternative anti-reflective layer 610 comprising an organized arrangement of surface variations. For instance, anti-reflective layer 610 may be a surface that is triangulated. A triangulated surface may have an organized arrangement of sloped surfaces that reflect incident light away from its source. By reflecting light away from its source, anti-reflective layer 610 may make it more difficult for a user to see acoustic divider 602 from outside the mobile communications device.

Although FIGS. 6A and 6B illustrate anti-reflective layers on a top surface 612 of acoustic divider 602, embodiments are not limited to such configurations. For example, anti-reflective layers 604 and 610 may be disposed on side surfaces 606 and 608 to prevent side surfaces 606 and 608 from increasing the visual footprint of acoustic divider 602. Furthermore, one skilled in the art understands that even though FIGS. 6A and 6B illustrate acoustic divider 602 as a rectangular prism, such embodiments are not intended to be limiting. For instance, acoustic divider 602 may be in the shape of a triangular prism that has anti-reflective layers on its slanted side surfaces. In such embodiments, an anti-reflective layer may not be disposed on a top surface of the acoustic divider because of its top peak.

1. Effectiveness of Acoustic Dividers

Figure 7:
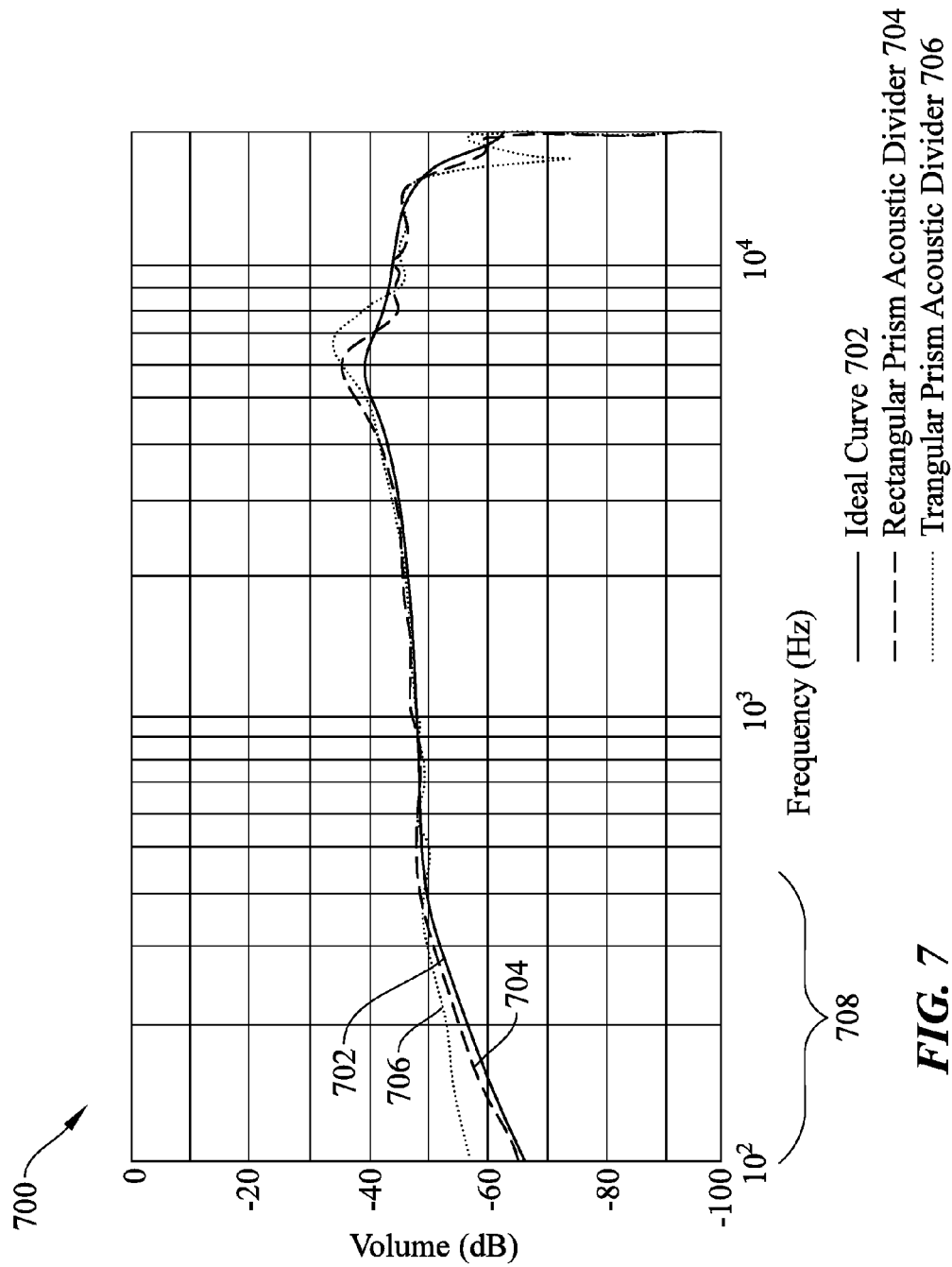
FIG. 7 is a chart plot showing acoustic curves for different types of acoustic dividers, according to embodiments of the present invention.

As discussed herein, the geometry of the acoustic divider according to embodiments of the present invention may determine its ability to prevent acoustic coupling. Some geometries may perform better at preventing acoustic coupling than other geometries. FIG. 7 illustrates a chart plot 700 to better illustrate the different acoustic coupling performances of the different geometries. It is to be appreciated that the presence of the acoustic divider also decreases variation in the detected sound. That is, sounds detected by a microphone when an acoustic divider is present can be more consistent across a number of samples than without the acoustic divider. Such variation is not illustrated in FIG. 7, but one skilled in the art understands that implementing the acoustic divider decreases sound variation.

Chart plot 700 has an X-axis representing frequencies of sounds in logarithmic scale, and a Y-axis representing volume in decibels (dB) increasing upwards in increments of 20 dB. The curves plotted on chart plot 700 represent emitted sound (i.e., emitted sound 114 in FIG. 1) from a receiver (i.e., receiver 104 in FIG. 1 or receiver 208 in FIGS. 3 and 4A-4B) as detected by an error-detecting microphone (i.e., microphone 110 in FIG. 1 or microphone 210 in FIGS. 3 and 4A-4B).

Three curves are plotted on chart plot 700: an ideal curve 702, a rectangular acoustic divider curve 704, and a triangular prism acoustic divider curve 706. As shown in FIG. 7, ideal curve 702 is illustrated as a solid line, rectangular divider curve 704 is a dashed line, and triangular divider curve 704 is a dotted line. Ideal curve 702 may represent sound detected by the error-detecting microphone when no acoustic coupling is present. Thus, ideal curve 702 may be compared with other curves to show how effectively the different dividers can minimize acoustic coupling.

As illustrated in FIG. 7, rectangular prism divider curve 704 and triangular prism divider curve 706 may not significantly depart from ideal curve 702. In embodiments, a low frequency boost in detected sound may be received by the error-detecting microphone. For example, sounds detected in a low frequency region 708 of divider curves 704 and 706 may depart from ideal curve 702. This light deviation from ideal curve 702 may be caused by minimal acoustic coupling between the receiver and the microphone. When no acoustic divider is implemented, a greater deviation from ideal curve 702 within low frequency region 708 may be observed.

Rectangular prism divider curve 704 may have less departure than triangular prism divider curve 706 because, as aforementioned herein, the non-tapering structural configuration of a rectangular prism acoustic divider more effectively decreases acoustic coupling between the receiver and the microphone. Although a triangular prism acoustic divider has a slightly higher deviation than a rectangular prism acoustic divider, its magnitude of deviation is still lower than implementations without an acoustic divider. The lower deviation in the received sound results in more accurate calculations for the complex algorithms carrying out the noise-cancellation functionalities, thereby resulting in better performance of noise cancellation. Furthermore, the lower deviation seen in noise-cancellation functionality also applies to lower deviation in auto loudness functionalities. Thus, complex algorithms performing auto loudness may also see improved accuracy in its calculations.

III. Method of Preventing Acoustic Coupling

Figure 8:
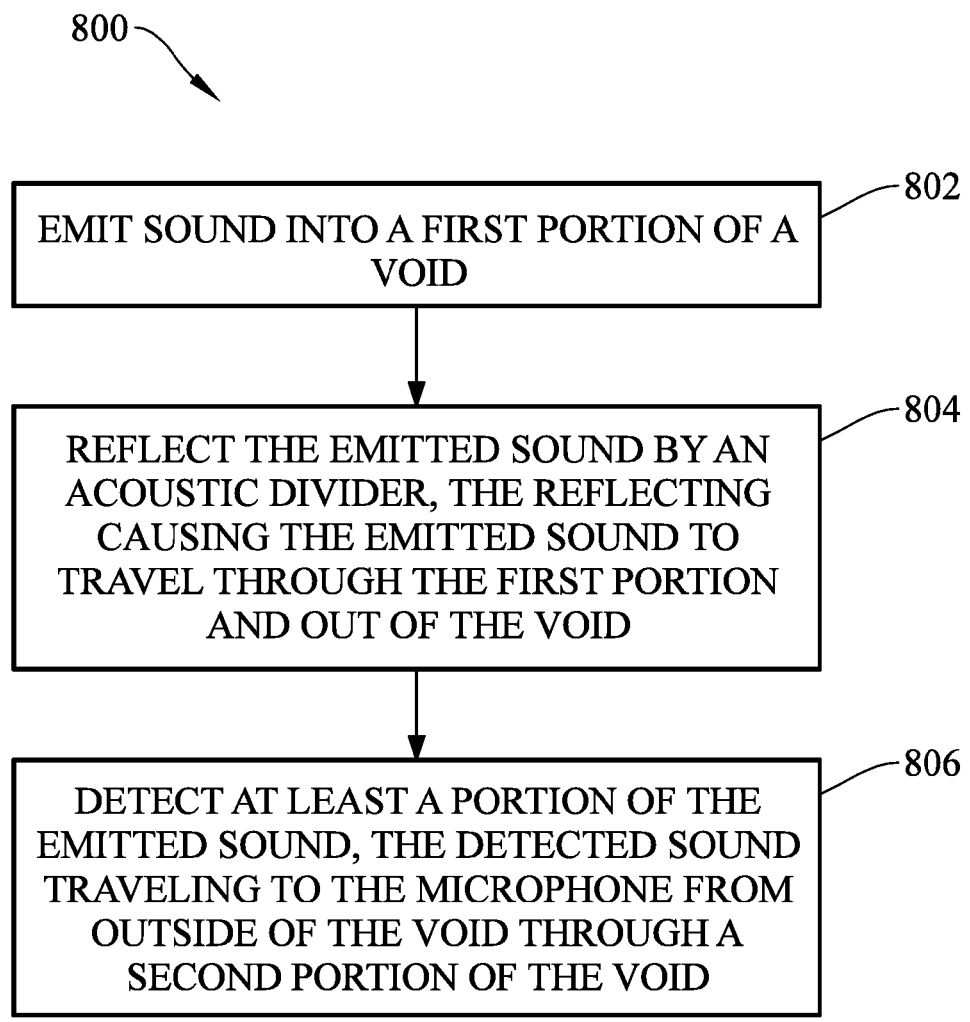
FIG. 8 is a flow chart of a method of preventing acoustic coupling, according to embodiments of the present invention.

FIG. 8 illustrates a method 800 of preventing acoustic coupling in a mobile communication device according to embodiments of the present invention. At block 802, sound may be emitted into a first portion of a void. For instance, sound 218 from FIG. 4C, which may include sound 114 and 116 in FIG. 1, may be emitted from a receiver, such as receiver 208 in FIG. 4C. The emitted sound may enter into the receiver portion of the void, e.g., receiver portion 404 of void 206 in FIG. 4C.

At block 804, the emitted sound may be reflected by an acoustic divider, such as acoustic divider 402 in FIG. 4C. The emitted sound may be portion 306 of sound 218 emitted from receiver 208 as discussed in FIG. 4C. In some embodiments, the acoustic divider may be in the shape of a triangular prism. Once reflected by the acoustic divider, the emitted sound may reflect back into and/or out of the first portion of the void. In some instances, sound reflected off of the acoustic divider may exit out of the mobile communication device such that it may be heard by a user.

At block 806, at least a portion of the emitted sound may be detected by a microphone, such as microphone 210 in FIG. 4C. In embodiments, the portion of emitted sound may be portion 216 of emitted sound 218 as discussed in FIG. 4C. Portion 216 of emitted sound may enter into a second portion of the void as effective sound 220, which may be sound that represents what is heard by a user. In embodiments, the second portion of the void may be microphone portion 406 of void 206. Microphone 210 may detect effective sound 220 and may not detect portions of emitted sound 218 before emitted sound 218 exited the mobile communication device. Accordingly, acoustic coupling may be mitigated. In certain embodiments, the second portion of the void (e.g., microphone portion 406 of void 206 in FIG. 4C) may be acoustically isolated from the first portion of the void (e.g., receiver portion 404 of void 206 in FIG. 4C).

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A mobile communication device comprising:
   a housing having an outer surface and internal sidewalls, wherein the outer surface and internal sidewalls define a void disposed at and below the outer surface of the housing;
   a receiver disposed within the housing and below a first portion of the void, the receiver configured to emit sound into the void;
   a microphone disposed within the housing and below a second portion of the void, the microphone configured to detect sound present in the void; and
   an acoustic divider disposed within the void and laterally disposed between the receiver and the microphone, the acoustic divider acoustically isolating the first and second portions of the void.

2. The mobile communication device of claim 1, wherein the acoustic divider is in a shape of a triangular prism.

3. The mobile communication device of claim 1, wherein the acoustic divider comprises a sound-reflective material.

4. The mobile communication device of claim 3, wherein the acoustic divider comprises silicone.

5. The mobile communication device of claim 1, wherein the acoustic divider is a portion of the housing.

6. The mobile communication device of claim 1, wherein the acoustic divider is coupled to the housing.

7. The mobile communication device of claim 6, wherein the acoustic divider is coupled to the housing with an adhesive or a mechanical fastener.

8. The mobile communication device of claim 1, further comprising a mesh disposed near the outer surface of the housing, wherein the mesh encloses the void.

9. The mobile communication device of claim 8, wherein the mesh comprises a plurality of apertures configured to prevent debris from entering the void while permitting sound to exit and enter the void.

10. The mobile communication device of claim 8, wherein the acoustic divider has a peak that is disposed proximate to the mesh.

11. The mobile communication device of claim 10, wherein a height of the acoustic divider is substantially the same as a height of the void.

12. The mobile communication device of claim 1, wherein the housing comprises comprising an acoustic channel disposed between the receiver and the void, the acoustic channel configured to guide sound emitted by the receiver into the void.

13. The mobile communication device of claim 12, wherein the housing further comprises an acoustic sealing boot disposed around the acoustic channel.

14. The mobile communication device of claim 13, wherein the acoustic sealing boot comprises the acoustic divider.

15. A mobile communication device comprising:
    a housing having an outer surface and internal sidewalls, wherein the outer surface and internal sidewalls define a void disposed at and below the outer surface of the housing;
    a receiver disposed within the housing and below a first portion of the void, the receiver configured to emit sound into the void;
    a microphone disposed within the housing and below a second portion of the void, the microphone configured to detect sound present in the void; and
    an acoustic divider comprising:
       a first sound channel configured to isolate sound emitted from the receiver; and
       a second sound channel configured to isolate sound received by the microphone, wherein the first and second sound channels are acoustically isolated from one another.

16. The mobile communication device of claim 15, wherein heights of both first and second sound channels are equal to the height of the void.

17. A method of preventing acoustic coupling in a mobile communication device comprising:
    emitting, by a receiver, sound into a first portion of a void disposed in a housing of the mobile communication device;
    reflecting, by an acoustic divider, the emitted sound, the reflecting causing the emitted sound to travel through the first portion and out of the void; and
    detecting, by a microphone, at least a portion of the emitted sound, the detected sound traveling to the microphone from outside of the void through a second portion of the void, wherein the second portion of the void is acoustically isolated from the first portion of the void by the acoustic divider.

18. The method of claim 17, wherein the emitted sound is reflected away from the receiver by a slanted surface of the acoustic divider.

19. The method of claim 17, wherein the reflecting enables substantially all of the emitted sound in the first portion of the void to travel out of the void.

20. The method of claim 17, wherein the at least a portion of the emitted sound detected by the microphone comprises emitted sound reflected off of a user's ear.

\* \* \* \* \*